(12) United States Patent
Beck

(10) Patent No.: US 6,375,699 B1
(45) Date of Patent: Apr. 23, 2002

(54) INJECTION MOLD FOR INSERT-MOLDING A SYNTHETIC MATERIAL AROUND A FILTER MATERIAL, FILTER FOR THE FILTRATION OF FLUIDS AND METHOD FOR PRODUCING SUCH FILTER

(75) Inventor: Roland Beck, Kamen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/529,394
(22) PCT Filed: Oct. 7, 1998
(86) PCT No.: PCT/US98/21140
§ 371 Date: Apr. 11, 2000
§ 102(e) Date: Apr. 11, 2000
(87) PCT Pub. No.: WO99/20450
PCT Pub. Date: Apr. 29, 1999

(30) Foreign Application Priority Data

Oct. 17, 1997 (DE) .......................... 197 45 919

(51) Int. Cl.[7] ............................................ B01D 29/07
(52) U.S. Cl. ................ 55/497; 55/DIG. 5; 55/DIG. 31; 264/257; 264/264; 264/279; 425/127; 425/129.1
(58) Field of Search ............................... 55/385.3, 497, 55/511, 514, 502, 521, 524, DIG. 5, DIG. 31; 96/134, 135, 154; 264/257, 274, 275, 264, 279, DIG. 48; 425/127, 129.1; 210/493.3, 493.4

(56) References Cited

U.S. PATENT DOCUMENTS

| | | | |
|---|---|---|---|
| 3,017,698 A | * 1/1962 | Hambrecht et al. | |
| 4,543,283 A | 9/1985 | Curtze et al. | 428/38 |
| 5,531,892 A | * 7/1996 | Duffy | 55/492 |
| 5,674,302 A | * 10/1997 | Nakayama et al. | 55/521 |
| 5,679,122 A | * 10/1997 | Moll et al. | 55/521 |
| 5,720,790 A | * 2/1998 | Kometani et al. | 55/521 |
| 5,772,738 A | * 6/1998 | Muraoka | 55/486 |
| 5,902,361 A | * 5/1999 | Pomplun et al. | 55/502 |

FOREIGN PATENT DOCUMENTS

| | | |
|---|---|---|
| DE | 2162355 | 6/1973 |
| EP | 0 448 876 A2 | 10/1991 |
| GB | 2 125 707 | 3/1984 |
| JP | 58-49417 A * | 3/1983 |
| JP | 63287521 | 11/1988 |
| JP | 63306266 | 12/1988 |

* cited by examiner

Primary Examiner—David A. Simmons
Assistant Examiner—Frank M. Lawrence
(74) Attorney, Agent, or Firm—Gary L. Griswold; Robert W. Sprague; William J. Bond

(57) ABSTRACT

The injection mold for insert-molding a synthetic material around the edge of a filter material comprising at least one particle filter layer and at least one active carbon layer of active carbon particles, is provided with a first mold half and a second mold half which comprise mutually confronting mold walls. In their assembled state, the two mold halves define a receiving space for the filter material, a molding space for accommodating the edge of the filter material and for forming the synthetic material to be arranged by insert molding around the edge of the filter material, with at least one injection channel entering the molding space, and a transition space arranged between the receiving space and the molding space for accommodating the edge portion of the filter material adjacent the edge of the filter material. The transition space is formed with a constricted portion for preventing the leakage of synthetic material from the molding space into the receiving space. The constricted portion comprises at least two narrowed portions with a widened portion arranged therebetween, the distance of the mold walls of the two mold halves being smaller in the narrowed portions than in the widened portion. The two narrowed portions and the widened portion are arranged respectively transversely to that direction of the transition space which is oriented between the molding space and the receiving space.

13 Claims, 4 Drawing Sheets

INJECTION MOLD FOR INSERT-MOLDING A SYNTHETIC MATERIAL AROUND A FILTER MATERIAL, FILTER FOR THE FILTRATION OF FLUIDS AND METHOD FOR PRODUCING SUCH FILTER

BACKGROUND OF THE INVENTION

The present invention relates to an injection mold for insert-molding a synthetic material around the edge of a filter material used particularly for the filtration of air streaming into the interior of a motor vehicle. Further, the invention relates to a method for producing a filter for the filtration of fluids, as used particularly in vehicles. Finally, the invention relates to a filter for the filtration of fluids.

For improving the function of filters for the cleaning of a fluid flow, i.e. particularly of an air flow, increasing use is made of active carbon filters, apart from conventional particle filters. For easy handling during the production of such filters, it is suitable to use filter materials which, in addition to at least one particle filter layer, also comprise an active carbon layer of active carbon particles. For improved convenience during the assembly of filters, the filter materials of the filters are connected—at least along parts of their edges—to stiffening elements which are particularly provided as frames surrounding the edge of the filter material. Such frames or stiffening elements fulfill a holding function because, if the filter material is folded into a zig-zag shape for enlarging the filter surface, they will maintain the corrugated structure of the filter surface.

The attachment of stiffening elements or a continuous frame to a filter material is realized in a cost-saving manner by molding a synthetic material around the filter material. For this purpose, the filter material is inserted into an injection mold, with the edge of the filter material projecting into a molding space of the injection mold and the rest of the filter material being arranged in a receiving space of the injection mold. Now, to prevent the leakage of synthetic material into the receiving space when injecting the synthetic material into the receiving space, the injection mold must be in sealing abutment on the filter material so that no fluid connection between the molding space and the receiving space exists for the viscous synthetic material. The molding of synthetic material around a filter material is difficult particularly if, due to the structure of the filter material, a tightly sealed closure between the molding space and the receiving space can be realized not at all or only by extreme pressure forces acting on the filter material. This is the case, e.g., when the filter material, in addition to a particle filter layer, also comprises an active carbon layer of active carbon particles or has porous properties. The porous structure of an active carbon layer requires the application of relatively high press-on forces which, in the region between the molding space and the receiving space, are exerted by the injection mold onto the filter material to thus squeeze off the filter material, as it were. These high force cause considerable wear of the injection mold so that the cost-saving effects obtainable by the molding technology are partially neutralized due to increased expenses for injection molds.

It is an object of the invention to provide an injection mold for insert-molding a synthetic material around the edge of a filter material comprising at least one particle filter layer and at least one active carbon layer of active carbon particles, wherein the region between the molding space and the receiving space is tightly sealed against leakage of the viscous synthetic material in the direction towards the filter material, with only minimum press-on forces being required.

For solving the above object, the instant invention provides an injection mold for insert-molding a synthetic material around the edge of a filter material. In particular, the filter material comprises at least one particle filter layer and at least one active carbon layer of active carbon particles. The injection mold comprises a first mold half and a second mold half, having mutually confronting mold walls. In the assembled state the two mold halves define the following cavities therebetween a receiving space for the filter material; a molding space for accommodating the edge of the filter material and for forming the synthetic material to be molded around the edge of the filter material; at least one injection channel entering the molding space; and a transition space arranged between the receiving space and the molding space for accommodating the edge portion of the filter material adjacent the edge of the filter material. The transition space is formed with a constricted portion for preventing the leakage of synthetic material from the molding space into the receiving space. The constricted portion comprises at least two narrowed portions with a widened portion arranged therebetween. The distance of the mold walls of the two mold halves is smaller in the narrowed portions than in the widened portion, and the two narrowed portions and the widened portion are arranged respectively transverse to the direction of the transition space, which is oriented between the molding space and the receiving space.

The injection mold of the invention comprises two mold halves which, in the closed condition, form a receiving space for the filter material, a molding space for forming the synthetic material to be molded around the edge of the filter material, and a transition space between the receiving space and the molding space. The filter material to be subjected to insert molding is placed into the receiving space, with the edge portion of the filter material extending through the transition space up to the molding space. Thus, the actual edge of the filter material projects from the transition space into the molding space. Arranged within the transition space is a constricted portion formed by the walls of the two mold halves; within this constricted portion, the mold walls of the mold halves are arranged in fluid-tight abutment on the filter material when the latter has been inserted.

According to the invention, the constricted portion of the transition space comprises at least two narrowed portions and a widened portion arranged therebetween. In each of the narrowed portions, the distance of the mold walls of the two mold halves is smaller than in the widened portion. In this manner, the two mold halves together with the inserted filter material provide a fluid-tight closure, formed in the manner of a labyrinth seal, against the synthetic material injected in a liquid state. The at least two narrowed portions, which are arranged transversely to that direction of the transition space which is oriented between the molding space and the receiving space and, when viewed along the direction of the transition space are arranged behind each other between the molding space and the receiving space, act like two barriers for preventing the intrusion of viscous synthetic material from the molding space into the receiving space.

Because of the provision of a plurality of narrowed portions, the two mold halves in these narrowed portions need abut the filter material only with a lower press-on force to realize a fluid-tight closure between the molding space and the receiving space. The widened portion arranged between respectively two narrowed portions serves for accommodating filter material which has been laterally displaced due to squeezing in the narrowed portions. Thus, in the invention, active carbon particles (in as far as they are not decreased in size when squeezing the filter material) are urged from the edge zones of two adjacent narrowed portions into the widened portion arranged therebetween. Further, the widened portion or each of the plurality of widened portions functions like a dead volume for receiving viscous synthetic material which, during the molding process performed on the edge of the filter material (possibly still) passes through the narrowed portion on the side of the molding space.

Preferably, a highly reliable production with an almost negligible percentage of rejects is realized by providing the constricted portion of the transition space with three narrowed portions with intermediate widened portions, with the narrowed portions and the widened portions being arranged alternately in that direction of the transition space which is oriented between the molding space and the receiving space.

In a further preferred embodiment of the invention, also the molding space is provided with at least one constricted portion dividing the molding space into a first partial space and a second partial space. This constricted portion of the molding space increases the flow resistance to the injected synthetic material. The edge of the filter material projects into that partial space of the molding space which follows the transition space, and the injection channel or the injection channels for injecting the synthetic material into the molding space enter into the other partial space of the molding space. By this arrangement, a flow gradient directed to the edge of the filter material is generated within the molding space. As a result, it can be safeguarded within in certain limits—that, when injecting the synthetic material, that partial space of the molding space which has the injection channels entering thereinto will be filled first. Only thereafter, the front of the viscous synthetic material passes the constricted portion to enter the other partial space of the molding space which has the edge of the filter material projecting thereinto. Thereby, in turn, it is accomplished that the synthetic material will primarily flow from the partial space comprising the injection channels into the partial space receiving the edge of the filter material, instead of flowing in the reverse direction. In this manner, a "washing out" of the edge of the filter material, i.e. a detachment of active carbon particles from the edge of the filter material, is largely prevented, which has a favorable effect for the design of the finished filter because no or nearly no active carbon particles will penetrate into the synthetic-material element molded around the filter material. The injection mold of the invention is particularly suited for insert molding a synthetic material around filter materials which comprise an active carbon layer of active carbon particles arranged between two nonwoven layers. In such a configuration, one of the two nonwoven layers functions as a particle filter layer and is preferably formed from an electret material. This electret material preferably comprises synthetic fibers of polypropylene which have been given electret properties. While that layer of the filter material which serves as a particle filter layer is arranged before the active carbon layer when viewed in the flow direction, the second nonwoven layer is arranged behind the active carbon layer and is particularly provided to keep the active carbon particles from being detached and carried along with the fluid flow to be filtered.

The inventive filter is provided with a synthetic material therearound by an insert molding process using the inventive injection mold. The filter comprises a filter material having upper and lower sides and a limiting edge. In particular the filter material comprising at least one particle filter layer and an active carbon layer of active carbon particles with a frame surrounding the limiting edge and having the limiting edge of the filter material embedded therein. At least two deepened grooves having a rib arranged therebetween and are arranged adjacent to the frame and substantially parallel to the direction of the frame at least in a part of the upper side and/or the lower side of the filter material.

The inventive filter is distinguished particularly by the provision of two deepened grooves in the frame-side region of the filter material, with a rib formed between the two deepened grooves. The at least two deepened grooves and the rib arranged therebetween are arranged substantially in parallel to the direction of at least one portion of the (synthetic) frame (attached by insert molding).

Corresponding to the number of narrowed portions within the constricted portion of the transition space of the injection mold, the filter in the frame-side region of its filter material comprises a plurality of deepened grooves with respective ribs arranged therebetween.

In a preferred embodiment of the inventive filter, the frame has a reduced thickness in the region of the embedded edge of the filter material. This narrowed portion of the frame corresponds to the narrowed portion of the molding space of the injection mold that has been used for producing the inventive filter.

BRIEF DESCRIPTION OF THE DRAWINGS

A preferred embodiment of the filter according to the invention and an embodiment of the injection mold according to the invention will be described hereunder in greater detail with reference to the drawings.

DETAILED DESCRIPTION OF THE PREFERRED EMBODIMENT

Figure 1:
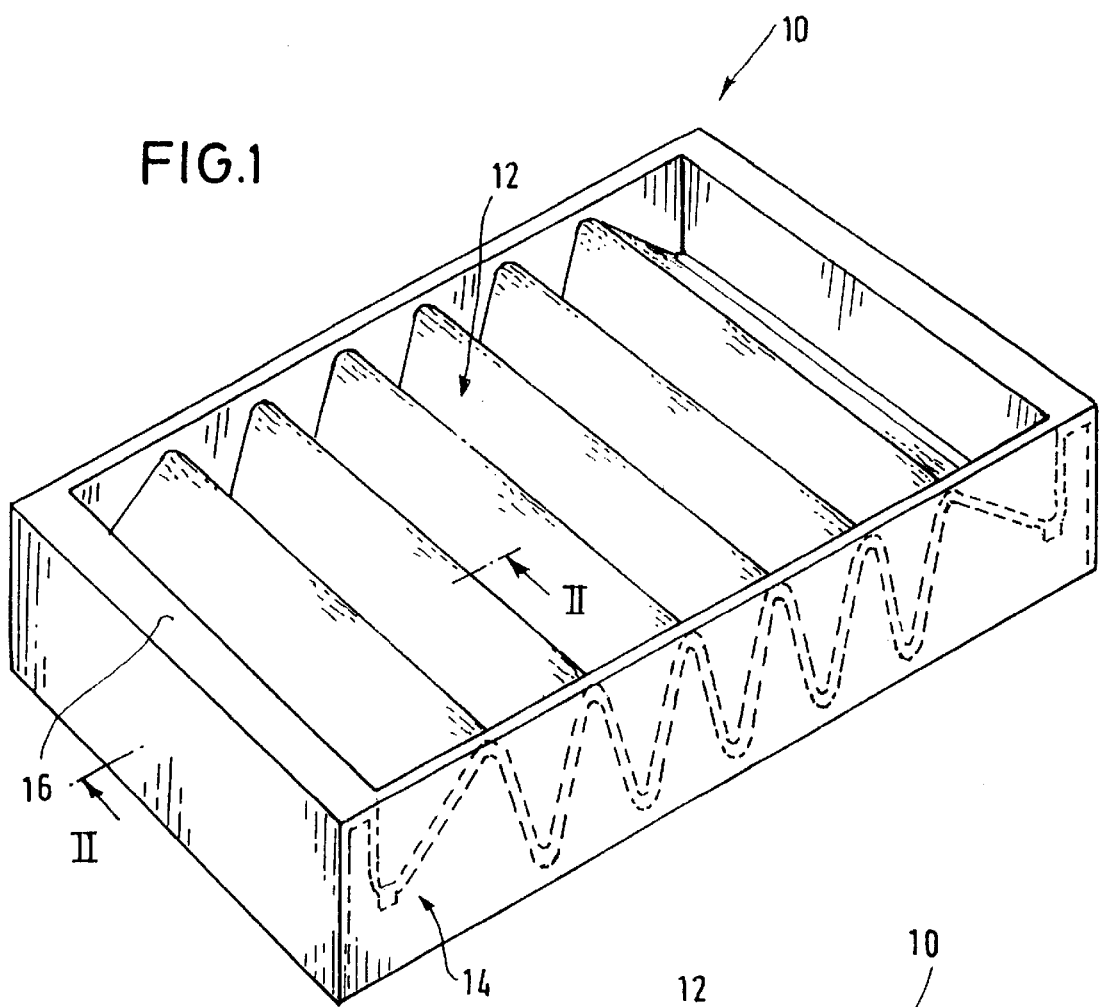
FIG. 1 shows a perspective view of a filter comprising a filter material with two non-woven layers and an active carbon layer arranged therebetween, and a frame of synthetic material molded around the filter material.
Figure 2:
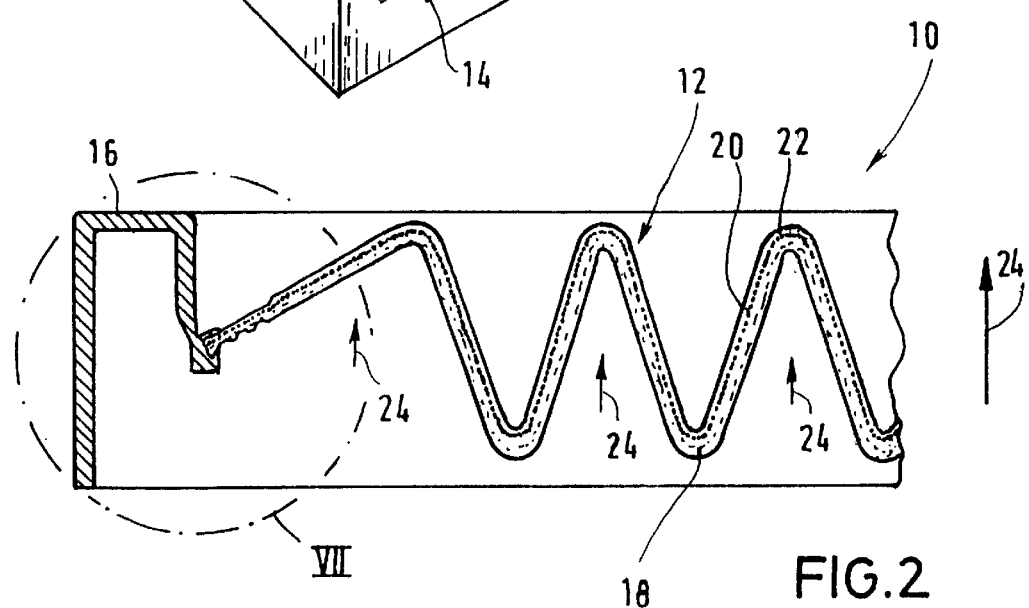
FIG. 2 shows a sectional view along the line II—II of FIG. 1.
Figure 6:
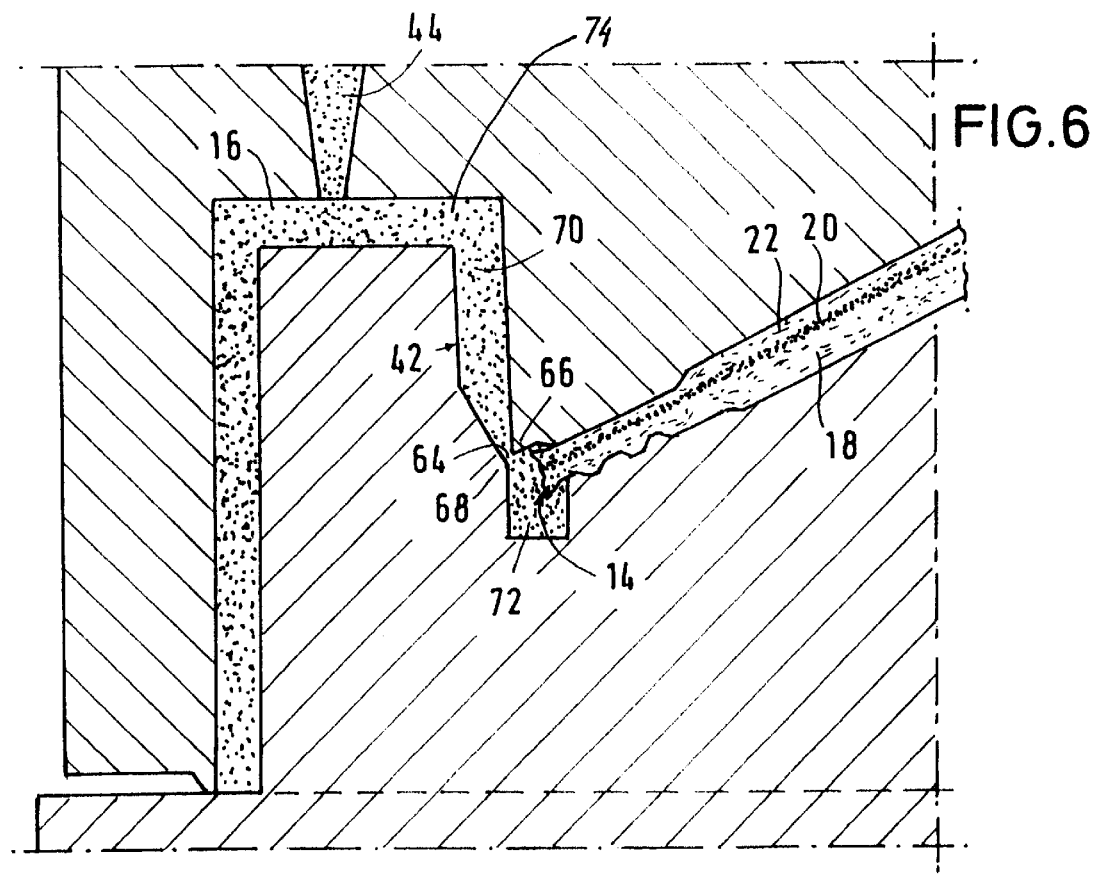
FIG. 6 shows a sectional view similar to FIG. 5 wherein, however, the whole molding space is filled with synthetic material.
Figure 7:
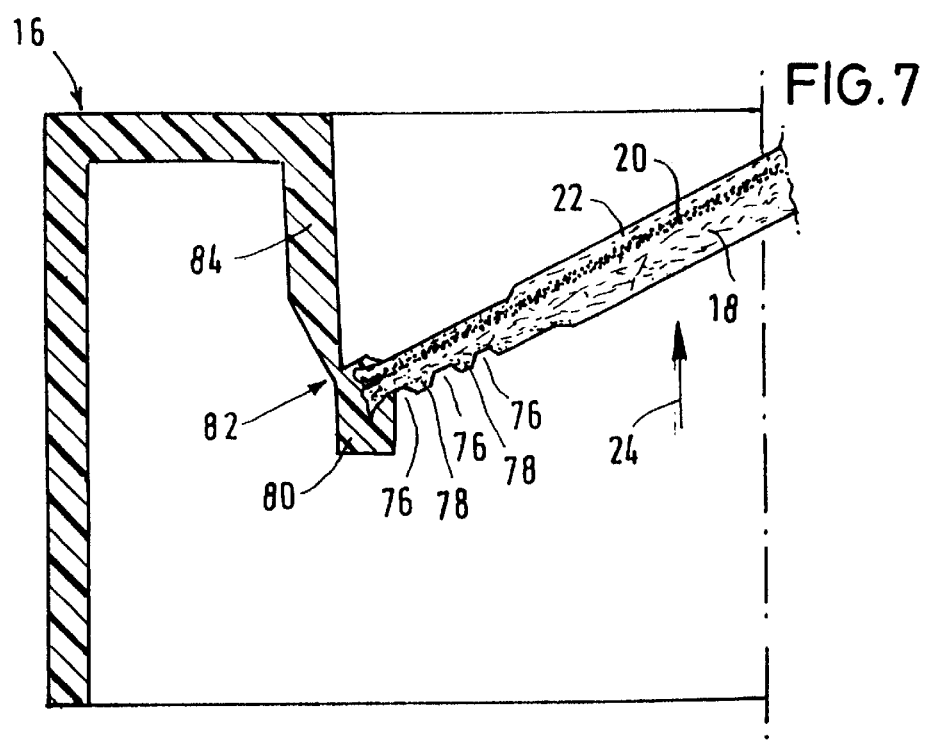
FIG. 7 shows an enlarged view of the region VII of FIG. 2 for better illustration of the transition space between the frame and the therein embedded filter material of the filter according to FIG. 1.

FIGS. 1, 2 and 7 show fall or partial views of a filter element 10 which, by means of an injection mold according to FIGS. 3 to 6 has been provided with a frame structure of a synthetic material arranged therearound by insert molding. Filter element 10 comprises a three-layered filter material 12 arranged in zig-zag-shaped or wave-shaped folds. The edge 14 of filter material 12 is surrounded by a continuous frame 16 of a synthetic material having the edge 14 of the filter material embedded therein. In this manner, a tight mechanical connection is established between the frame 16 and the filter material 12, with the frame 16 supporting the zig-zag or wave structure of filter material 12.

As shown in FIGS. 2 and 7, the filter material 12 comprises a filtering non-woven layer 18. This filtering non-woven layer 18 acts like a particle filter and comprises individual fibers of a synthetic material with electret properties. Arranged on the filtering non-woven layer 18 is an active carbon layer 20 of active carbon particles. This active carbon layer 20 functions like a deodorizing filter and will trap, e.g., harmful substances from the fluid—particularly air—which is to be filtered, on the side of the active carbon layer 20 facing away from the filtering non-woven layer 18, a cover non-woven layer 22 of synthetic fibers is arranged. The thickness of the cover non-woven layer 22 is substantially smaller than the thickness of the filtering non-woven layer 18. Further, the cover nonwoven layer 22 has a considerably larger stiffness than the filtering non-woven layer 18. In FIGS. 2 and 7, the direction of the fluid flow to be filtered by the filter 10 is indicated by an arrow at 24. As evident therefrom, the filtering non-woven layer 18 in the flow direction 24 is arranged before the active carbon layer 20 which in turn has the cover non-woven layer 22 arranged therebehind. Thus, the purpose of cover non-woven layer 22 resides primarily in preventing a detachment of particles of the active carbon layer 20 and lending support to the active carbon layer 20 as a whole.

Figure 3:
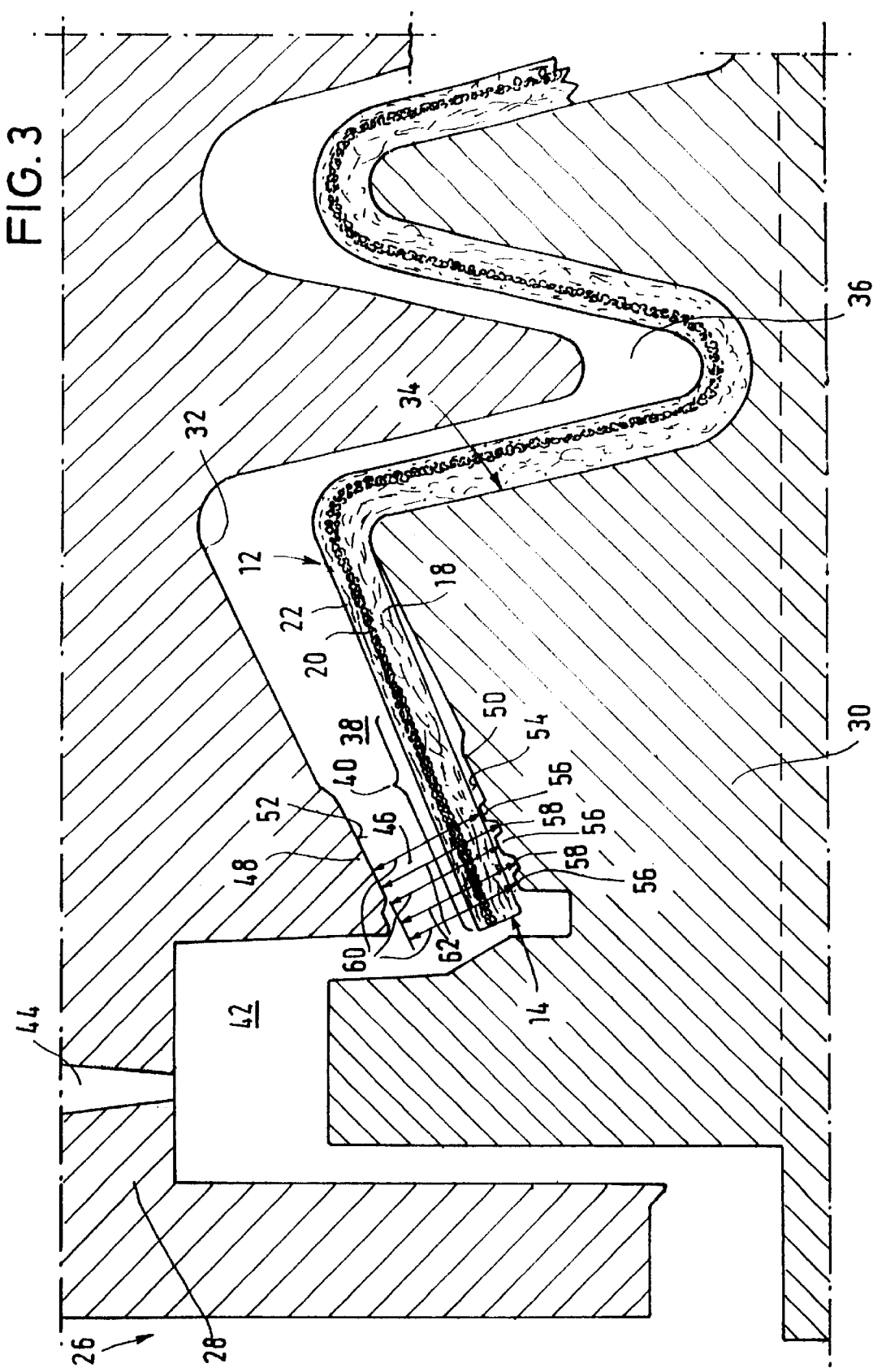
FIG. 3 shows a sectional view along the line II—II of FIG. 1, wherein the filter material of the filter according to FIG. 1 is arranged between the two halves of an injection mold for molding synthetic material around the filter material and the two halves of the injection molded are not yet fully moved into their closed condition.

For producing the frame 16 of synthetic material, the three-layered filter material 12 is inserted into the injection mold 26, partially shown in FIG. 3 in sectional view, which comprises an upper mold half 28 and a lower mold half 30. Both mold halves 28, 30 comprise mutually confronting mold walls 32, 34 forming spaces therebetween which will be described in greater detail hereunder.

In the central region of the injection mold, the two mold halves 28, 30 define a wave-like receiving space 36 therebetween for receiving the filter material 12.

Towards the edge of filter material 12, the receiving space 36 is followed by a transition space 38 having the edge portion 40 extending therethrough. The end of transition space 38 facing away from receiving space 36 is followed by a molding space 42 whose configuration will define the shape of frame 16. The edge 14 of filter material 12 projects from transition space 38 into molding space 42. Injection channels 44, extending through upper mold half 28, enter into molding space 42.

By means of the injection mold 26 as partially shown in FIG. 3, a synthetic material, e.g. polypropylene, can be arranged by insert molding around the filter material 12 on the edge 14 of the filter material. When thus insert-molding a synthetic material around the part inserted into an injection mold—in the instant case, the filter material 12—it is imperative that the injected synthetic material will not penetrate into all of the regions of the inserted part, i.e. the filter material 12. Thus, when the injection mold has been moved into its closed condition, a tight closure must be obtained between the two mold halves 28, 30 on the one hand and the filter material 12 on the other hand to thus provide a fluid-tight sealing for the injected synthetic material. This causes problems especially when using the filter material 12 discussed here, due to the active carbon layer. This problem could be solved by selecting a correspondingly high force for pressing the two mold halves onto the filter material 12 in the edge portion 40, which, however, would subject the filter material to a considerable squeeze-off effect. High press-on forces, however, cause an increased wear of the injection mold 26.

Figure 4:
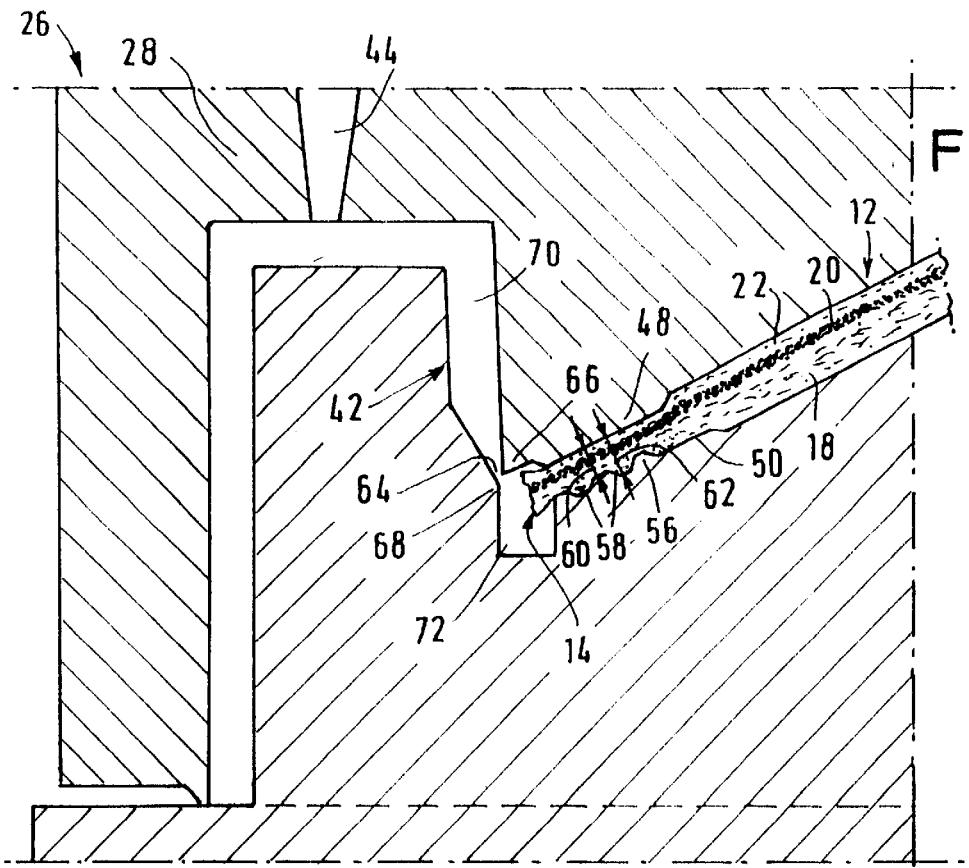
FIG. 4 shows a sectional view similar to FIG. 3 in the closed condition of the injection mold.
Figure 5:
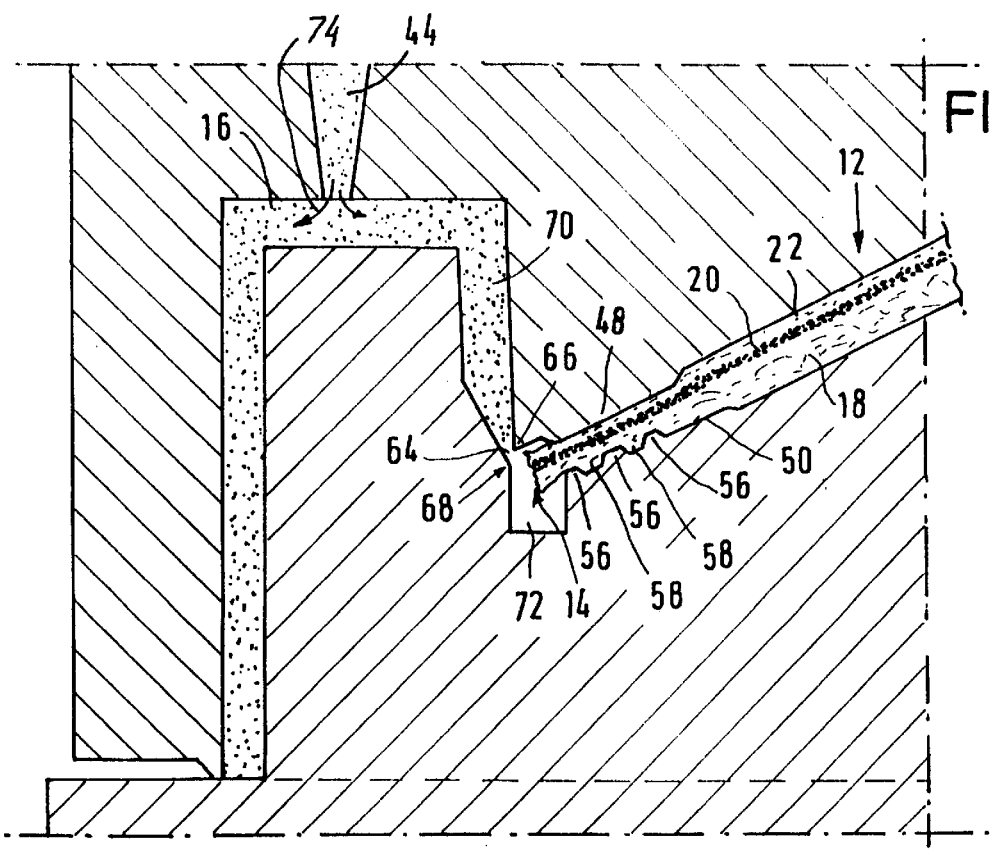
FIG. 5 shows a view similar to FIG. 4 wherein, however, that partial space of the frame-forming molding space which follows the injection channel or the injections channels is already filled with injected synthetic material.

In the injection mold 26 as described herein and illustrated in the Figures, a fluid-tight closure between the two mold halves 28, 30 on the one hand and the filter material 12 on the other hand is realized by providing the transition space 38 with a constricted portion 46 within which the mold walls 32, 34 are formed with projections 48, 50. While the projection 48 of the upper mold half 28 is of a substantially trapezoidal shape and has a continuous, flat outer face 52 directed towards the lower mold half 30, the outer side 54 of the projection 50 of the lower mold half 30 is formed with three mutually parallel, longitudinal ribs 56 with deepened portions 58 arranged therebetween. The ribs 56 and the deepened portions 58 run along the direction of the edge portion 40 and the edge 14 of filter material 12, respectively. In the closed condition of the injection mold (cf. FIG. 4), the edge portion 40 of filter material 12 is heavily compressed by the ribs 56 along three zones. The height of the ribs 56 is selected in accordance with the nature (compressibility and composition) of the synthetic material and the injection pressures of the synthetic material in such a manner that, in these zones, there will be generally a tight abutment of the two mold halves 28,30 on the filter material 12. As shown in FIG. 4, the ribs 56 act on the filtering non-woven layer 18, while the projection 48 of the upper mold half 28 acts on the cover non-woven layer 22 of the filter material 12. By the increased press-on force in the narrowed portions Go formed by the ribs 56 in the constricted portion 46 of the transition space 38, also the active carbon layer 20 arranged between the non-woven layers 18 and 22 is compressed. The deepened portions 58 arranged between the ribs 56 define widened portions 62 which can serve for accommodating filter material displaced in the narrowed portions 60.

As is best seen in FIG. 4, the molding space 42 is provided at 64 with a constriction (narrowed portion) provided as a reduction of cross-section and formed by mutually confronting projections 66, 68 of the mold walls 32, 34 of the two mold halves 28, 30. By this constriction 64 or narrowed portion, the molding space 42 is divided into first and second partial spaces 70, 72. In this arrangement, the second partial space 72 forms the connecting space between the first partial space 70 of the molding space 42 and the transition space 38. This second partial space 72, which thus joins the transition space 38 while arranged opposite to the receiving space 36, has the edge 14 of the filter material projecting thereinto. The injection channels 44 enter into the first partial space 70 of molding space 42. On the whole, the shape of the molding space 42 resembles a U of which one leg has its free end is formed by the second partial space 72.

With reference to FIGS. 3 to 6, the process of producing the filter element 10 will be explained hereunder.

First, the three-layered filter material 12 is folded into a zig-zag-shape and placed into the lower mold half 30 of the injection mold 26. Subsequently, the upper mold half 28 is moved against the lower mold half 30, thus closing the injection mold 26 (cf. FIG. 4). In this condition, the filter material 12, except for its edge portion 40, is arranged in the receiving space 36 of injection mold 26. The edge portion 40 of the filter material 12 extends through the transition space 38 up to the molding space 42, with the actual edge 14 of the filter material 12 projecting into the second partial space 72 of molding space 42. The two mold halves 28,30 can be brought to a suitable temperature so that the injected synthetic material will not cool down too much during the actual injection process.

Starting from the situation according to FIG. 4, synthetic material 74 is now injected into the molding space 42 through the injection channels 44. In the region of the constriction or narrowed portion 64, the molding space 42 offers an increased flow resistance. As a result, initially, primarily the first partial space 70 will be filled with synthetic material 74. Only when the first partial space 70 has been substantially filled with synthetic material 74 (cf. FIG. 5), synthetic material 74 will enter also into the second partial space 72. Thus, the oncoming flow of the injected synthetic material 74 will spread substantially unidirectionally in the direction of the second partial space 72 and within space 72. Therefore, the amount of synthetic material 74 flowing back again from the second partial space 72 into the first partial space 70 is negligible. This offers the advantage that practically no turbulences, which might cause a "washing" on the edge 14 of the filter material 12, will occur in the second partial space 72. Due to the narrowed portions 60 of the transition space 38, the synthetic material reaching the second partial space 72 is prevented from entering the transition space 38 to any noteworthy extent. Even if synthetic material 74 still passes the first narrowed portion 60 of transition space 38 on the side of the molding space, this synthetic material will be trapped by the widened portion 62 adjacent this narrowed portion. Already the provision of at least two narrowed portions 60 will almost completely exclude a leakage of injected synthetic material 74 beyond the second narrowed portion 60 into the transition space 38. Thus, at the end of the injection process, the situation will be as depicted in FIG. 6. In this condition, the edge 14 of filter material 12, projecting into the second partial space 72 of molding space 42, is enclosed by synthetic material 74. In other words, this means that the filter material 12 along its edge 14 is embedded in synthetic material 74. When the synthetic material 74 has solidified, the two mold halves 28, 30 are moved apart, and the filter material 12 along with the synthetic material molded therearound, i.e. the filter element 10, is removed from the injection mold 26. The solidified synthetic material 74 will then form the edge 14 of the filter material.

Thus, according to FIG. 7, the filter material has its edge portion 40 formed with depressions shaped as deepened grooves 76, with raised portions shaped as ribs 78 arranged therebetween. This structure is generated by a corresponding shape of the mold wall 34 of the lower mold half 30 in the constricted portion 46. The edge 14 of the filter material 12 is embedded on the free end 80 of one leg of the substantially U-shaped frame 16. This free end 80 is connected to the remaining part 84 of the frame 16 through a constricted portion 82 of reduced diameter.

I claim:

1. An injection mold for insert-molding a synthetic material around the edge of a filter material said injection mold comprising:
   a first mold half and a second mold half, comprising mutually confronting mold walls which in the assembled state of the first and second mold halves define at least one cavity therebetween the at least one cavity comprising a receiving space for the filter material,
   a molding space for accommodating the edge of the filter material and for forming the synthetic material to be insert-molded around the edge of the filter material, at least one injection channel entering the molding space, and
   a transition space arranged between the receiving space and the molding space for accommodating the edge portion of the filter material adjacent the edge of the filter material, wherein
   the transition space is formed with a constricted portion for preventing the leakage of synthetic material from the molding space into the receiving space,
   the constricted portion comprises at least two narrowed portions with a widened portion arranged therebetween, the distance of the mold walls of the two mold halves being smaller in the narrowed portions than in the widened portion, and
   the two narrowed portions and the widened portion are arranged respectively transversely to that direction of the transition space which is oriented between the molding space and the receiving space.

2. The injection mold according to claim 1, characterized in that the constricted portion comprises three narrowed portions and two widened portions arranged respectively between adjacent narrowed portions.

3. The injection mold according to claim 1, characterized in that the molding space is provided with at least one narrowed portion for generating a flow gradient for the injected synthetic material directed to the edge of the filter material, that the at least one narrowed portion of the molding space divides the molding space into a first partial space and a second partial space, and that the at least one injection channel enters into the first partial space of the molding space, and the second partial space of the molding space is provided for receiving the edge of the filter material.

4. The injection mold according to claim 1, characterized in that the constricted portion of the transition space is formed by alternately arranged ribs and deepened portions in at least one of those two regions of the mold walls of the mold halves which define the constricted portion.

5. The injection mold according to claim 1, characterized in that the receiving space is wave-shaped.

6. A method for producing a filter comprising a filter material by injection molding using an injection mold, said method comprising the following steps:
   placing a filter material into one of two mold halves of the injection mold,
   closing the injection mold by moving the two mold halves towards each other, wherein the filter material is arranged in a receiving space, an edge portion of the filter material adjacent a limiting edge extends through a transition space, and the edge portion of the filter material projects into a molding space, the molding space forming the receiving space and a further space for forming a remaining portion of the frame wherein the receiving space and the remaining space are separated by a narrowed portion;
   injecting flowable synthetic material through at least one injection channel into the molding space,
   solidifying the synthetic material filling the molding space, opening the injection mold by moving the two mold halves away from each other, and removing the filter material and the solidified synthetic material forming the frame.

7. A filter for the filtration of fluids, comprising a filter material having upper and lower sides and a limiting edge the filter material comprising-at least one particle filter layer and an active carbon layer of active carbon particles, a frame surrounding the limiting edge and having the limiting edge of the filter material embedded therein, and at least two deepened grooves having a rib arranged therebetween and being arranged adjacent to the frame and substantially parallel to the direction of the frame at least in a-part of the upper side and/or the lower side of the filter material.

8. The filter according to claim 7, characterized in that three deepened grooves and two ribs are formed on the upper side and/or the lower side of the filter material, with a respective rib being arranged between each pair of adjacent deepened grooves.

9. The filter according to claim 7, characterized in that the deepened grooves and the rib or the ribs is/are formed in the particle filter layer and/or the active carbon layer.

10. The filter according to claim 7, characterized in that the filter material comprises a particle filter layer and a cover nonwoven layer, the active carbon layer being arranged therebetween.

11. The filter according to claim 10, characterized in that the deepened grooves and the rib or the ribs are formed in the particle filter layer or the cover non-woven layer.

12. The filter according to claim 7, characterized in that the filter material is wave-shaped.

13. The filter according to claim 7, characterized in that the frame comprises a narrowed portion arranged between that part of the frame which accommodates the limiting edge of the filter material and the remaining part of the frame.

* * * * *